US012701169B2

(12) United States Patent
Butt et al.

(10) Patent No.: US 12,701,169 B2
(45) Date of Patent: Aug. 4, 2026

(54) BACKUP PROCEDURE FOR AMBIENT IOT DEVICE CONNECTIVITY THROUGH A SMARTPHONE

(71) Applicant: Nokia Technologies Oy, Espoo (FI)

(72) Inventors: Muhammad Majid Butt, Naperville, IL (US); Nitin Mangalvedhe, Naperville, IL (US); Muhammad Tayyab, Oulu (FI)

(73) Assignee: Nokia Technologies Oy, Espoo (FI)

( * ) Notice: Subject to any disclaimer, the term of this patent is extended or adjusted under 35 U.S.C. 154(b) by 496 days.

(21) Appl. No.: 18/327,974

(22) Filed: Jun. 2, 2023

(65) Prior Publication Data

US 2024/0406275 A1    Dec. 5, 2024

(51) Int. Cl.
H04L 67/51 (2022.01)
H04W 72/25 (2023.01)
H04W 4/80 (2018.01)

(52) U.S. Cl.
CPC .............. H04L 67/51 (2022.05); H04W 72/25 (2023.01); H04W 4/80 (2018.02)

(58) Field of Classification Search
CPC .......... H04L 67/51; H04W 72/25; H04W 4/80
USPC ........................................................ 709/217
See application file for complete search history.

(56) References Cited

U.S. PATENT DOCUMENTS

| | | |
|---|---|---|
| 7,009,495 B2 | 3/2006 | Hughes et al. |
| 2007/0164109 A1 | 7/2007 | Ridings et al. |

| | | | |
|---|---|---|---|
| 2022/0108092 A1 | 4/2022 | Wan et al. | |
| 2024/0151815 A1* | 5/2024 | Wang ..................... | G01S 7/4865 |
| 2024/0163840 A1* | 5/2024 | Säily ....................... | G01S 7/006 |
| 2024/0250852 A1* | 7/2024 | Patchava .............. | G06K 7/0008 |
| 2024/0255634 A1* | 8/2024 | Wang ....................... | G01S 13/75 |
| 2024/0259090 A1* | 8/2024 | Wang ....................... | H04B 7/22 |
| 2024/0322876 A1* | 9/2024 | Elshafie .............. | H04B 7/0626 |
| 2024/0323931 A1* | 9/2024 | Abedini ............. | H04B 7/04013 |
| 2024/0323988 A1* | 9/2024 | Elshafie ............... | H04W 72/23 |

(Continued)

FOREIGN PATENT DOCUMENTS

| | | |
|---|---|---|
| EP | 1977366 B1 | 6/2013 |
| EP | 3646249 A1 | 5/2020 |
| WO | 2019/005043 A1 | 1/2019 |

OTHER PUBLICATIONS

International Search Report and Written Opinion received for corresponding Patent Cooperation Treaty Application No. PCT/EP2024/060389, dated Jun. 13, 2024, 9 pages.

(Continued)

*Primary Examiner* — Jungwon Chang
(74) *Attorney, Agent, or Firm* — Barta Jones, PLLC

(57) ABSTRACT

A user equipment apparatus includes at least one processor and at least one memory. The at least one memory stores instructions which, when executed by the at least one processor, cause the user equipment apparatus at least to: receive, from a network device, an instruction to provide backscattering service to at least one ambient IoT device for a service period of time T, the instruction including a configuration for sidelink communication with one or more backup user equipment apparatuses (backup UEs) capable of providing backscattering service to at least one ambient IoT device; and provide, based on the instruction, the backscattering service by transmitting at least one request for tag identification.

6 Claims, 8 Drawing Sheets

(56)          References Cited

U.S. PATENT DOCUMENTS

2025/0063616 A1*  2/2025  Elshafie ................ H04W 24/10
2025/0219792 A1*  7/2025  Yin ......................... H04L 27/12

OTHER PUBLICATIONS

Kamoun, "RFID System Management: State-of-the Art and Open Research Issues", IEEE Transactions on Network and Service Management, vol. 06, No. 03, Sep. 2009, pp. 190-205.
International Search Report and Written Opinion received for corresponding Patent Cooperation Treaty Application No. PCT/EP2024/059279, dated Jun. 19, 2024, 11 pages.
PCT Application No. PCT/EP2023/064833, "Authentication for Ambient Iot Devices", filed on Jun. 2, 2023, pp. 1-49.
"3rd Generation Partnership Project; Technical Specification Group Services and System Aspects; Study on Ambient power-enabled Internet of Things (Release 19)", 3GPP TR 22.840, V0.4.0, Feb. 2023, pp. 1-115.
"New SID: Study on Ambient IoT", 3GPP TSG RAN#97e, RP-222685, Agenda: 9.1, Huawei, Sep. 12-16, 2022, 5 pages.
PCT Application No. PCT/CN2022/138836, "Attachment of Energy Harvesting Device", filed on Dec. 13, 2022, pp. 1-39.
PCT Application No. PCT/CN2022/138684, "Attachment of Energy Harvesting Device", filed on Dec. 13, 2022, pp. 1-40.
U.S. Appl. No. 63/417,096, "Attachment Procedure for Passive Iot Device Communication with Ambient Energy Source", filed Oct. 18, 2022, pp. 1-39.
U.S. Appl. No. 63/417,101, "Implementation of Attachment for Passive Iot Device Communication with Ambient Energy Source", filed Oct. 18, 2022, pp. 1-37.
"3rd Generation Partnership Project; Technical Specification Group Services and System Aspects; Proximity based Services (ProSe) in the 5G System (5GS) (Release 18)", 3GPP TS 23.304, V18.1.0, Mar. 2023, pp. 1-143.
"Annex for Communication Modes of Low Power Consumption", 3GPP TSG-SA WG1 Meeting #101, S1-230211, Agenda: 7.2, CMCC, Feb. 20-24, 2023, 10 pages.
"Discussion on ambient power-enabled IoT", 3GPP TSG-RAN #95-e, RP-220182, Agenda: 9.11, OPPO, Mar. 2022, pp. 1-33.
"Consolidation on Functional Requirement of Ambient IoT", 3GPP TSG-SA WG1 Meeting #101, S1-230163, Agenda: 7.2, OPPO, Jan. 20-24, 2023, 18 pages.
"Wi-Fi 6", Wikipedia, Retrieved on Jun. 28, 2023, Webpage available at : https://en.wikipedia.org/wiki/Wi-Fi_6.
"3rd Generation Partnership Project; Technical Specification Group Radio Access Network; NR; NR and NG-RAN Overall Description; Stage 2 (Release 16)", 3GPP TS 38.300, V16.6.0, Jun. 2021, pp. 1-152.

* cited by examiner

BACKUP PROCEDURE FOR AMBIENT IOT DEVICE CONNECTIVITY THROUGH A SMARTPHONE

FIELD

Various example embodiments relate generally to wireless networking and, more particularly, to ambient Internet of Things (IoT) devices in wireless networking.

BACKGROUND

The Internet of Things (IoT) generally describes a network of devices that have communication capability and that are interconnected with each other to exchange and/or share information. The devices may include a modem that enables wireless connectivity. Certain estimates show that, by 2030, around twenty-nine billion IoT devices may be deployed around the world. Advancements in communications technologies and/or infrastructure will need to keep pace to support growth of IoT devices. Accordingly, there is continuing interest in improving wireless and communications technologies.

SUMMARY

In various aspects, the foregoing methods may be performed by a processor-implemented method. A processor-implemented method may be implemented by one or more processors. In various aspects, the foregoing methods may be performed by a computer-implemented method. A computer-implemented method may be implemented by one or more computers.

In accordance with aspects of the present disclosure, a user equipment apparatus includes at least one processor and at least one memory. The at least one memory stores instructions which, when executed by the at least one processor, cause the user equipment apparatus at least to: receive, from a network device, an instruction to provide backscattering service to at least one ambient internet of things (IoT) device for a service period of time T, the instruction including a configuration for sidelink communication with one or more backup user equipment apparatuses (backup UEs) capable of providing backscattering service to at least one ambient IoT device; and provide, based on the instruction, the backscattering service by transmitting at least one request for tag identification.

In an aspect of the user equipment apparatus, the instructions, when executed by the at least one processor, may further cause the user equipment apparatus at least to: decide to cease providing the backscattering service prior to the end of the period of time T; and transmit, to the network device prior to the end of the service period of time T, a notification indicating the decision to cease providing the backscattering service.

In an aspect of the user equipment apparatus, the instructions, when executed by the at least one processor, may further cause the user equipment apparatus at least to: transmit, by the sidelink communication to a second UE among the one or more backup UEs, a request for an indication of availability to provide the backscattering service for at least a reminder of the service period of time T. The request may indicate that the backscattering service is to be provided at an excitation power P.

In an aspect of the user equipment apparatus, the instructions, when executed by the at least one processor, may further cause the user equipment apparatus at least to:

receive, from the second UE, a response to the request for the indication of availability, the response including one of: an indication of availability to provide the backscattering service or an indication of no availability to provide the backscattering service; and transmit, to the network device, a message corresponding to the response.

In accordance with aspects of the present disclosure, a method includes: receiving, by a user equipment apparatus from a network device, an instruction to provide backscattering service to at least one ambient IoT device for a service period of time T, the instruction including a configuration for sidelink communication with one or more backup user equipment apparatuses (backup UEs) capable of providing backscattering service to at least one ambient IoT device; and providing, based on the instruction, the backscattering service by transmitting at least one request for ambient IoT device identification.

In an aspect of the method, the method may further include: deciding to cease providing the backscattering service prior to the end of the period of time T; and transmitting, to the network device prior to the end of the service period of time T, a notification indicating the decision to cease providing the backscattering service.

In an aspect of the method, the method may further include: transmitting, by the sidelink communication to a second UE among the one or more backup UEs, a request for an indication of availability to provide the backscattering service for at least a reminder of the service period of time T. The request may indicate that the backscattering service is to be provided at an excitation power P.

In an aspect of the method, the method may further include: receiving, from the second UE, a response to the request for the indication of availability, the response including one of: an indication of availability to provide the backscattering service; or an indication of no availability to provide the backscattering service; and transmitting, to the network device, a message corresponding to the response.

In accordance with aspects of the present disclosure, a network device includes at least one processor and at least one memory. The at least one memory stores instructions which, when executed by the at least one processor, cause the network device at least to: select a first user equipment apparatus (first UE) to provide backscattering service to at least one ambient IoT device; select one or more backup user equipment apparatuses (backup UEs) capable of providing the backscattering service to at least one ambient IoT device; transmit, to the first UE, an instruction to provide the backscattering service to ambient IoT devices for a service period of time T, the instruction including a configuration for sidelink communication with at least one of the backup UEs; and transmit, to at least one of the backup UEs, a configuration for sidelink communication with the first UE.

In an aspect of the network device, the instructions, when executed by the at least one processor, may further cause the network device at least to: receive, from the first UE prior to the end of the service period of time T, a notification indicating a decision to cease providing the backscattering service.

In an aspect of the network device, the instructions, when executed by the at least one processor, may further cause the network device at least to: receive, from the first UE, a message including one of: an indication that a second UE, among the one or more backup UEs, is available to provide the backscattering service; or an indication that the second UE is not available to provide the backscattering service.

In an aspect of the network device, the message may include the indication that the second UE is available to provide the backscattering service. The instructions, when executed by the at least one processor, may further cause the network device at least to: receive, from the second UE, a message acknowledging that the second UE is providing the backscattering service.

In an aspect of the network device, the message may include the indication that the second UE is not available to provide the backscattering service. The instructions, when executed by the at least one processor, may further cause the network device at least to: transmit, to at least one further UE among the one or more backup UEs, a request for an indication of availability to provide the backscattering service for at least a reminder of the service period of time T; and receive, from the at least one further UE, a response to the request for an indication of availability, the response including an indication of availability to provide the backscattering service.

In an aspect of the network device, the message may include the indication that the second UE is not available to provide the backscattering service, wherein the instructions, when executed by the at least one processor, further cause the network device at least to: reperform selection of at least one user equipment apparatuses capable of providing the backscattering service to at least one ambient IoT device.

In accordance with aspects of the present disclosure, a method includes: selecting a first user equipment apparatus (first UE) to provide backscattering service to at least one ambient IoT device; selecting one or more backup user equipment apparatuses (backup UEs) capable of providing the backscattering service to at least one ambient IoT device; transmitting, to the first UE, an instruction to provide the backscattering service to ambient IoT devices for a service period of time T, the instruction including a configuration for sidelink communication with at least one of the backup UEs; and transmitting, to at least one of the backup UEs, a configuration for sidelink communication with the first UE.

In an aspect of the processor-implemented method, the method may further include: receiving, from the first UE prior to the end of the service period of time T, a notification indicating a decision to cease providing the backscattering service.

In an aspect of the method, the method may further include: receiving, from the first UE, a message including one of: an indication that a second UE, among the one or more backup UEs, is available to provide the backscattering service; or an indication that the second UE is not available to provide the backscattering service.

In an aspect of the method, the message may include the indication that the second UE is available to provide the backscattering service, wherein the method may further include: receiving, from the second UE, a message acknowledging that the second UE is providing the backscattering service.

In an aspect of the method, the message may include the indication that the second UE is not available to provide the backscattering service. The method may further include: transmitting, to at least one further UE among the one or more backup UEs, a request for an indication of availability to provide the backscattering service for at least a reminder of the service period of time T; and receiving, from the at least one further UE, a response to the request for an indication of availability, the response including an indication of availability to provide the backscattering service.

In an aspect of the method, the message may include the indication that the second UE is not available to provide the backscattering service. The method may further include: reperforming selection of at least one user equipment apparatuses capable of providing the backscattering service to at least one ambient IoT device.

In accordance with aspects of the present disclosure, a user equipment apparatus includes at least one processor and at least one memory. The at least one memory stores instructions which, when executed by the at least one processor, cause the user equipment apparatus at least to: transmit, to a network device, an indication of availability to provide backscattering service to ambient IoT devices; receive, from the network device, a configuration for sidelink communication with a serving user equipment (serving UE) that is instructed by the network device to perform the backscattering service; and store the configuration for performing the sidelink communication with the serving UE.

In an aspect of the user equipment apparatus, wherein the instructions, when executed by the at least one processor, further cause the user equipment apparatus at least to: implement, based on the configuration, the sidelink communication with the serving UE.

In an aspect of the user equipment apparatus, the instructions, when executed by the at least one processor, may further cause the user equipment apparatus at least to: receive, by the sidelink communication from the serving UE, a request for an indication of availability to provide the backscattering service to ambient IoT devices for a period of time. The request indicates that the backscattering service is to be provided at an excitation power P.

In an aspect of the user equipment apparatus, wherein the instructions, when executed by the at least one processor, may further cause the user equipment apparatus at least to: transmit, by the sidelink communication to the serving UE, a response to the request for indication of availability, the response including one of: an indication of availability to provide the backscattering service; or an indication of no availability to provide the backscattering service.

In an aspect of the user equipment apparatus, the response may include an indication of availability to provide the backscattering service. The instructions, when executed by the at least one processor, may further cause the user equipment apparatus at least to provide the backscattering service to at least one ambient IoT device.

In an aspect of the user equipment apparatus, the instructions, when executed by the at least one processor, may further cause the user equipment apparatus at least to: transmit, to the network device, an acknowledgment of providing the backscattering service.

In accordance with aspects of the present disclosure, a processor-implemented method includes: transmitting, to a network device, an indication of availability to provide backscattering service to ambient IoT devices; receiving, from the network device, a configuration for sidelink communication with a serving user equipment (serving UE) that is instructed by the network device to perform the backscattering service; and storing the configuration for performing the sidelink communication with the serving UE.

In an aspect of the processor-implemented method, the method may further include: implementing, based on the configuration, the sidelink communication with the serving UE.

In an aspect of the processor-implemented method, the method may further include: receiving, by the sidelink communication from the serving UE, a request for an indication of availability to provide the backscattering service to ambient IoT devices for a period of time. The request may indicate that the backscattering service is to be provided at an excitation power P.

In an aspect of the processor-implemented method, the method may further include: transmitting, by the sidelink communication to the serving UE, a response to the request for indication of availability, the response comprising one of: an indication of availability to provide the backscattering service; or an indication of no availability to provide the backscattering service.

In an aspect of the processor-implemented method, the response may include an indication of availability to provide the backscattering service. The method may further include providing the backscattering service to at least one ambient IoT device.

In an aspect of the processor-implemented method, the method may further include: transmitting, to the network device, an acknowledgment of providing the backscattering service.

According to some aspects, there is provided the subject matter of the independent claims. Some further aspects are defined in the dependent claims.

BRIEF DESCRIPTION OF THE DRAWINGS

Some example embodiments will now be described with reference to the accompanying drawings.

DETAILED DESCRIPTION

Figure 1:
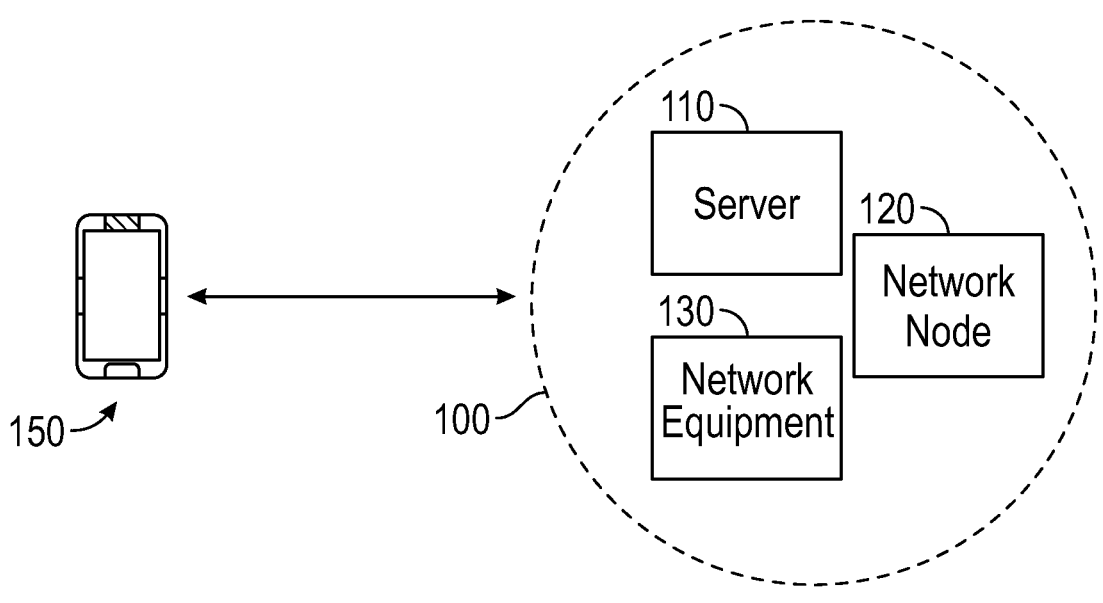
FIG. 1 is a diagram of an example embodiment of wireless networking between a network system and a user equipment apparatus (UE), according to one illustrated aspect of the disclosure.

In the following description, certain specific details are set forth in order to provide a thorough understanding of disclosed aspects. However, one skilled in the relevant art will recognize that aspects may be practiced without one or more of these specific details or with other methods, components, materials, etc. In other instances, well-known structures associated with transmitters, receivers, or transceivers have not been shown or described in detail to avoid unnecessarily obscuring descriptions of the aspects.

Reference throughout this specification to "one aspect" or "an aspect" means that a particular feature, structure, or characteristic described in connection with the aspect is included in at least one aspect. Thus, the appearances of the phrases "in one aspect" or "in an aspect" in various places throughout this specification are not necessarily all referring to the same aspect. Furthermore, the particular features, structures, or characteristics may be combined in any suitable manner in one or more aspects.

Embodiments described in the present disclosure may be implemented in wireless networking apparatuses, such as, without limitation, apparatuses utilizing Worldwide Interoperability for Microwave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), Long Term Evolution (LTE), LTE-Advanced, enhanced LTE (eLTE), 5G New Radio (5G NR), 5G Advance, 6G (and beyond) and 802.11ax (Wi-Fi 6), among other wireless networking systems. The term 'eLTE' here denotes the LTE evolution that connects to a 5G core. LTE is also known as evolved UMTS terrestrial radio access (EUTRA) or as evolved UMTS terrestrial radio access network (EUTRAN).

The present disclosure may use the term "serving network device" to refer to a network node or network device (or a portion thereof) that services a UE. The present disclosure may use the term "serving UE" to refer to a UE that services an ambient IoT device (e.g., providing backscattering service), and may use the term "candidate UE" to refer to a UE that is may potentially provide service to an ambient IoT device (e.g., provide backscattering service), and may use the term "target UE" to refer to a UE that is the target of a command to have the UE serve the ambient IoT device.

As used herein, the terms "transmit to," "receive from," and "cooperate with," (and their variations) include communications that may or may not involve communications through one or more intermediate devices or nodes. The term "acquire" (and its variations) includes acquiring in the first instance or reacquiring after the first instance. The term "connection" may mean a physical connection or a logical connection.

An ambient internet of things (IoT) device refers to a device that harvests energy from ambient sources such as radio waves, light, and/or vibrations, etc. An ambient device may use energy harvested from wireless radio waves or any other form of energy that can be harvested in its particular deployment scenario and may operate with ultra-low power in the range from tens of microwatts to hundreds of microwatts. For example, if energy is harvested from wireless radio waves, the output power of energy harvester could be from several micro-watt to tens of micro-watt. If a small solar panel is used for energy harvesting from solar/light, the output power could be less than 1 milli-watt due to size of the small solar panel. An ambient device may be battery-less or may store a limited amount of power (e.g., in a capacitor).

Ambient devices may be passive or active. An active energy harvesting device can harvest energy and then use an active circuit to transmit. While active devices include, for example, active components such as amplifiers, passive devices do not have any active components. Rather, passive energy harvesting devices use a communication technique known as backscattering, in which an external radio frequency (RF) signal is used for activation/excitation of the device and in which the RF signal is modulated with information by the passive device before being reflected/backscattered. In some examples, an ambient device may have capability to switch between being active or passive.

As will be explained in greater detail later in the present disclosure, the same device may be used to transmit the RF signal to activate a passive ambient IoT device and to read the backscatter signal from the passive ambient device (called "monostatic" configuration) or different devices may be used to transmit the activation and to read the backscatter (called "bistatic" configuration). The terms "activate," "excite," "illuminate," and "energize," and their variants, may be used interchangeably herein. The exciters and/or the readers may be 3GPP devices (e.g., gNB, smartphone, dedicated exciter, dedicated reader, or dedicated reader/exciter, etc.) or may be non-3GPP devices.

Ambient devices may be IoT devices. As mentioned above, IoT generally describes a network of devices that have communication capability to exchange and/or share information with the network. Ambient IoT devices, thus, are connected devices that harvest energy from ambient sources. As used herein, the term "ambient IoT device" may be used interchangeably with the terms "ambient IoT tag" or "ambient tag." An ambient IoT device may, for example, be attached to objects that need to be tracked, identified, or otherwise queried.

To read an ambient IoT device's transmission (e.g., active or backscatter), a reader should generally be in the vicinity of the ambient IoT device. Therefore, when an application or operation involves receiving ambient IoT device transmissions, exciters and readers in the vicinity of the ambient IoT devices may be used to do so. In the present disclosure, exciters and readers may be referred to separately. Unless indicated otherwise, it is intended and shall be understood that references to exciters and readers apply to both monostatic and bistatic configurations. Monostatic configuration refers to the scenario where both exciter and reader functionality is performed by the same device, while bistatic configuration refers to the situation when these functions are performed by two different devices. Additionally, where a monostatic configuration is shown or described in the present disclosure, the disclosed aspects shall be applicable to a bistatic configuration, and where a bistatic configuration is shown or described in the present disclosure, the disclosed aspects shall be applicable to a monostatic configuration.

Aspects of the present disclosure provides techniques for using user equipment apparatuses (UEs), which have wireless communication capabilities (e.g., 5G NR, 5G Advance, Wi-Fi, etc.), as exciters and/or readers of ambient IoT devices. As used herein, the term "backscattering service" refers to exciting/activating a passive ambient device and/or reading backscattering signals from a passive ambient device. Aspects of the present disclosure relate to identifying UEs that are in the vicinity of ambient IoT devices and that may provide backscattering service to such ambient IoT devices. Aspects of the present disclosure operate to engage an optimal number of UEs so that a sufficient number of ambient IoT devices are activated without wasting UE resources. Aspects of the present disclosure provide techniques for allowing UEs to authenticate ambient IoT devices and for allowing ambient IoT devices to authenticate UEs.

The present disclosure uses 5G NR as an example of a wireless network and uses smartphones as an example of UEs. It is intended and shall be understood that such examples are merely illustrative, and the present disclosure is applicable to other wireless networks and user equipment apparatuses.

FIG. 1 is a diagram depicting an example of wireless networking between a network system 100 and a user equipment apparatus (UE) 150. The network system 100 may include one or more network nodes 120, one or more servers 110, and/or one or more network equipment 130 (e.g., test equipment). The network nodes 120 will be described in more detail below. As used herein, the term "network device" may refer to any component of the network system 100, such as the server 110, the network node 120, the network equipment 130, any component(s) of the foregoing, and/or any other component(s) of the network system 100. Examples of network devices include, without limitation, apparatuses implementing aspects of 5G NR, among others. The present disclosure describes embodiments related to 5G NR and embodiments that involve aspects defined by 3rd Generation Partnership Project (3GPP). However, it is contemplated that embodiments relating to other wireless networking technologies are encompassed within the scope of the present disclosure.

The following description provides further details of examples of network nodes. In a 5G NR network, a gNodeB (also known as gNB) may include, e.g., a node that provides NR user plane and control plane protocol terminations towards the UE and that is connected via a NG interface to the 5G core (5GC), e.g., according to 3GPP TS 38.300 V16.6.0 (2021-June) section 3.2, which is hereby incorporated by reference herein.

A gNB supports various protocol layers, e.g., Layer 1 (L1)-physical layer, Layer 2 (L2), and Layer 3 (L3).

The layer 2 (L2) of NR is split into the following sublayers: Medium Access Control (MAC), Radio Link Control (RLC), Packet Data Convergence Protocol (PDCP) and Service Data Adaptation Protocol (SDAP), where, e.g.:

The physical layer offers to the MAC sublayer transport channels;

The MAC sublayer offers to the RLC sublayer logical channels;

The RLC sublayer offers to the PDCP sublayer RLC channels;

The PDCP sublayer offers to the SDAP sublayer radio bearers;

The SDAP sublayer offers to 5GC quality of service (QOS) flows;

Control channels include broadcast control channel (BCCH) and physical control channel (PCCH).

Layer 3 (L3) includes, e.g., radio resource control (RRC), e.g., according to 3GPP TS 38.300 V16.6.0 (2021-June) section 6, which is hereby incorporated by reference herein.

A gNB central unit (gNB-CU) includes, e.g., a logical node hosting, e.g., radio resource control (RRC), service data adaptation protocol (SDAP), and packet data convergence protocol (PDCP) protocols of the gNB or RRC and PDCP protocols of the en-gNB, that controls the operation of one or more gNB distributed units (gNB-DUs). The gNB-CU terminates the F1 interface connected with the gNB-DU. A gNB-CU may also be referred to herein as a CU, a central unit, a centralized unit, or a control unit.

A gNB Distributed Unit (gNB-DU) includes, e.g., a logical node hosting, e.g., radio link control (RLC), media access control (MAC), and physical (PHY) layers of the gNB or en-gNB, and its operation is partly controlled by the gNB-CU. One gNB-DU supports one or multiple cells. One cell is supported by only one gNB-DU. The gNB-DU terminates the F1 interface connected with the gNB-CU. A gNB-DU may also be referred to herein as DU or a distributed unit.

As used herein, the term "network node" may refer to any of a gNB, a gNB-CU, or a gNB-DU, or any combination of them. A RAN (radio access network) node or network node such as, e.g., a gNB, gNB-CU, or gNB-DU, or parts thereof, may be implemented by, e.g., a network device with at least one processor and/or at least one memory and with processor-readable instructions ("program") configured to support and/or provision and/or process CU and/or DU related functionality and/or features, and/or at least one protocol (sub-) layer of a RAN (radio access network), e.g., layer 2 and/or layer 3. Different functional splits between the central and distributed unit are possible. An example of such a device and its components will be described in connection with FIG. 9 below.

A network device, as used herein, may have components in a single housing, components in multiple housings at a single location, or may have components distributed across different geographies. All such configurations are contemplated to be within the scope of the present disclosure.

The gNB-CU and gNB-DU parts may, e.g., be co-located or physically separated. The gNB-DU may even be split further, e.g., into two parts, e.g., one including processing equipment and one including an antenna. A central unit (CU) may also be called BBU/REC/RCC/C-RAN/V-RAN, O-RAN, or part thereof. A distributed unit (DU) may also be called RRH/RRU/RE/RU, or part thereof. Hereinafter, in various example embodiments of the present disclosure, a network node, which supports at least one of central unit functionality or a layer 3 protocol of a radio access network, may be, e.g., a gNB-CU. Similarly, a network node, which supports at least one of distributed unit functionality or a layer 2 protocol of the radio access network, may be, e.g., a gNB-DU.

A gNB-CU may support one or multiple gNB-DUs. A gNB-DU may support one or multiple cells and, thus, could support a serving cell for a user equipment apparatus (UE) or support a candidate cell for handover, dual connectivity, and/or carrier aggregation, among other procedures.

The user equipment apparatus (UE) 150 may be or include a wireless or mobile device, an apparatus with a radio interface to interact with a RAN (radio access network), a smartphone, an in-vehicle apparatus, an IoT device, or a M2M device, among other types of user equipment. Such UE 150 may include: at least one processor; and at least one memory including program code; where the at least one memory and the computer program code are configured to, with the at least one processor, cause the apparatus at least to perform certain operations, such as, e.g., RRC connection to the RAN. An example of components of a UE will be described in connection with FIG. 9. In embodiments, the UE 150 may be configured to generate a message (e.g., including a cell ID) to be transmitted via radio towards a RAN (e.g., to reach and communicate with a serving cell). In embodiments, the UE 150 may generate and transmit and receive RRC messages containing one or more RRC PDUs (packet data units). Persons skilled in the art will understand RRC protocol as well as other procedures a UE may perform.

With continuing reference to FIG. 1, in the example of a 5G NR network, the network system 100 provides one or more cells, which define a coverage area of the network system 100. As described above, the network system 100 may include a gNB of a 5G NR network or may include any other apparatus configured to control radio communication and manage radio resources within a cell. As used herein, the term "resource" may refer to radio resources, such as a resource block (RB), a physical resource block (PRB), a radio frame, a subframe, a time slot, a sub-band, a frequency region, a sub-carrier, a beam, etc. In embodiments, the network node 120 may be called a base station.

FIG. 1 provides an example and is merely illustrative of a network system 100 and a UE 150. Persons skilled in the art will understand that the network system 100 includes components not illustrated in FIG. 1 and will understand that other user equipment apparatuses may be in communication with the network system 100.

Figure 2:
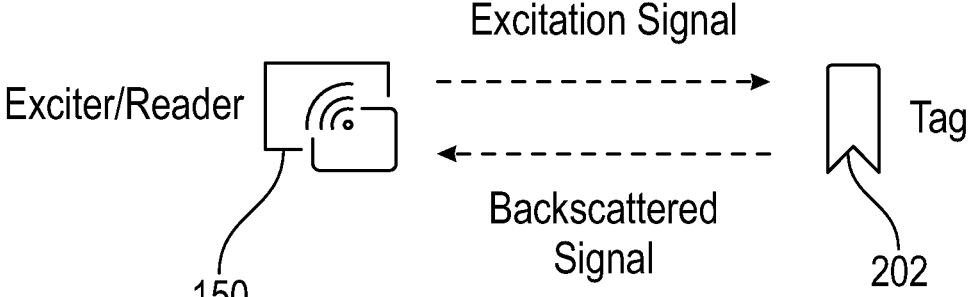
FIG. 2 is a diagram of an example embodiment of monostatic backscattering for wireless networking between an ambient IoT (AIoT) device and a UE, according to one illustrated aspect of the present disclosure.

FIG. 2 is a diagram of an example embodiment of a monostatic configuration for exciting an ambient IoT device and reading backscatter from the ambient IoT device. The illustrated monostatic configuration includes an exciter and reader combination device 250 (which may be UE 150 of FIG. 1) and includes an ambient IoT device 202 that is capable of passive backscattering. The exciter/reader device 250 emits a radio-frequency (RF) signal, and the ambient IoT device 202 harvests energy from the RF signal and is activated. Once activated, the ambient IoT device 202 modulates the received RF signal with information stored in the ambient IoT device 202 and reflects the modulated RF signal as the backscattered signal. The exciter/reader device 250 then receives the backscattered signal (i.e., the modulated RF signal) and demodulates it to extract the information from the ambient IoT device 202. In examples, a low-complexity modulation scheme, such as on-off keying (OOK), may be used.

Figure 3:
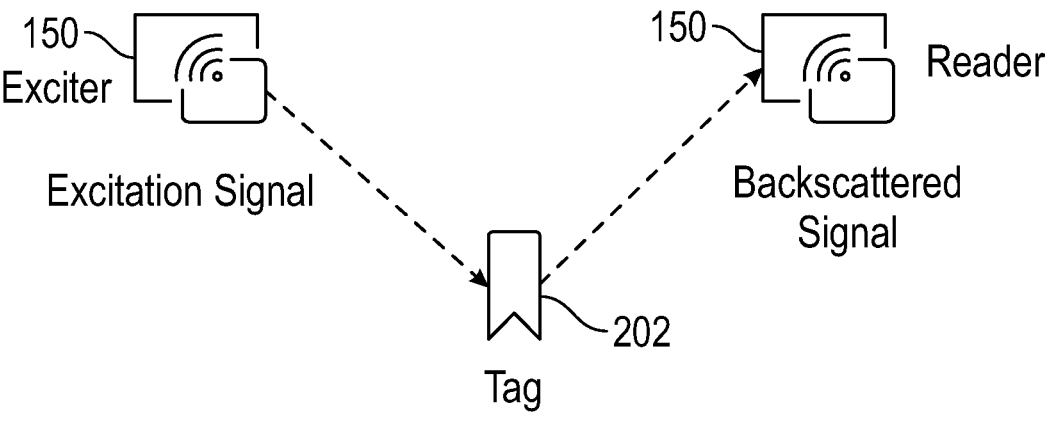
FIG. 3 is a diagram of an example embodiment of bistatic backscattering for wireless networking between an ambient IoT device and a first UE configured to perform reader functionality and a second UE configured to perform exciter functionality, according to one illustrated aspect of the present disclosure.

FIG. 3 is a diagram of an example embodiment of bistatic configuration for exciting an ambient IoT device and reading backscatter from the ambient IoT device. The illustrated bistatic configuration includes an exciter device 350, a reader device 355, and an ambient IoT device 202 capable of passive backscattering. The exciter device 350 and the reader device 355 may each be a UE (e.g., may be separate UEs like the UE 150 of FIG. 1). The difference between the bistatic configuration and the monostatic configuration is that the reader is a separate device from the exciter. The exciter device 350 emits a radio-frequency (RF) signal, and the ambient IoT device 202 harvests energy from the RF signal and is activated. Once activated, the ambient IoT device 202 modulates the received RF signal with information stored in the ambient IoT device 202 and reflects the modulated RF signal as the backscattered signal. The reader device 355 then receives the backscattered signal (i.e., the modulated RF signal) and demodulates it to extract the information from the ambient IoT device 202.

The bistatic configuration enables more flexible network and device topologies and may enable the exciter device 350 and/or the reader device 355 to be placed or used in locations that have lower path loss between the devices 350, 355 and the ambient IoT device 202. In various examples, the exciter device 350 may be a UE (e.g., UE 150, FIG. 1) and the reader device 355 may be a network node (e.g., 120, FIG. 1, e.g., gNB) which receives the backscattered signal from the ambient IoT device 202. Such embodiments are contemplated to be within the scope of the present disclosure.

In FIGS. 2 and 3, each of the exciter/reader devices 250, 350, 355 may have communication capability, such as capability for wireless communication with a wireless network (e.g., 5G NR, 5G Advance, Wi-Fi, etc.). In various examples, the ambient IoT device 202 may have capability to receive wireless communications from a wireless network. The ambient IoT device 202 have a memory that stores information and may be writable by a signal (e.g., activation signal). In various examples, the ambient IoT device may be capable of reading information in an incoming signal (e.g., activation signal) and may have some capability to process the information it reads. Such examples and features are within the scope of the present disclosure.

Figure 4:
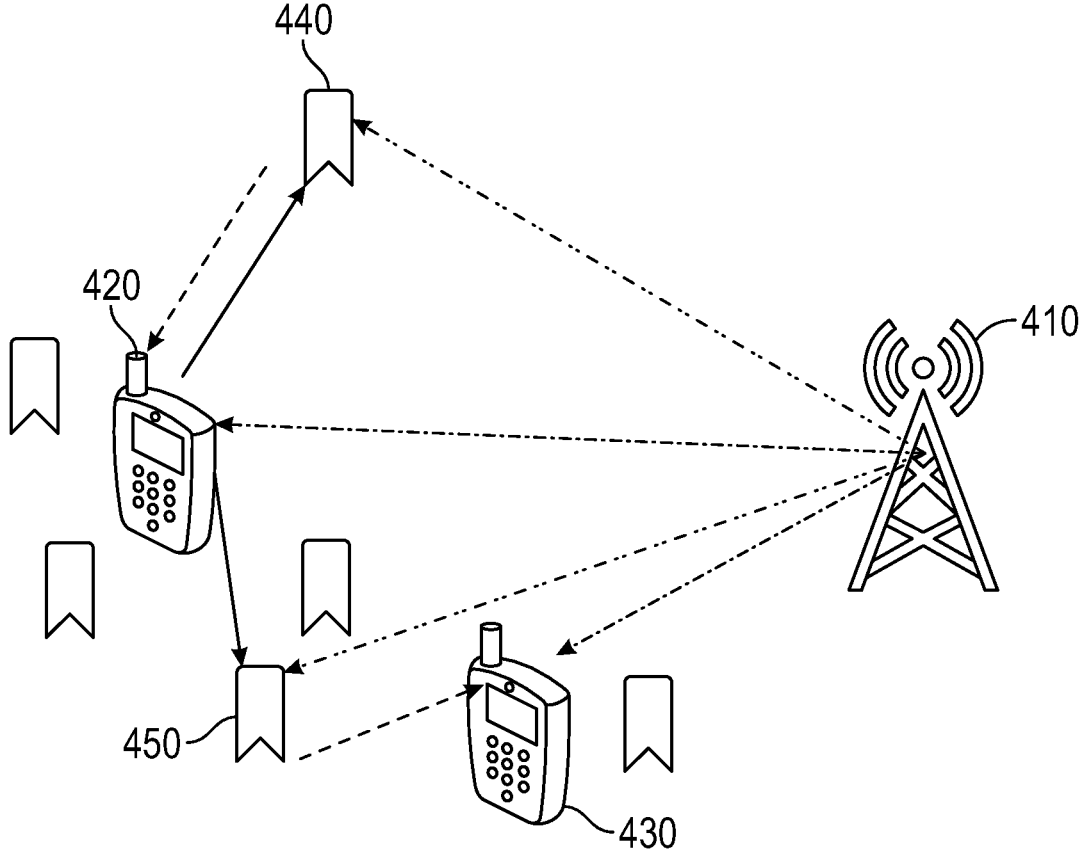
FIG. 4 is a diagram of an example embodiment of wireless networking between an ambient IoT device, a plurality of candidate UE, and a network system, according to one illustrated aspect of the disclosure.

FIG. 4 is a diagram of an example embodiment of wireless communications between UEs, ambient IoT devices (e.g., ambient tags), and a network device. The illustrated example includes a network device 410, a monostatic UE 420, a bistatic reader UE 430, and ambient IoT devices 440, 450. The network device 410 may be part of a 5G NR network and may be a network node (e.g., gNB) or portion thereof. The monostatic UE 420 and the bistatic reader 430 may be smartphones that are capable of communicating with the network device 410 (e.g., gNB). The ambient IoT devices 440, 450 may be passive devices, such as device 202 of FIG. 2 and FIG. 3. These examples are merely illustrative, and the network device 410, UEs 420, 430, and ambient IoT devices 440, 450 may be other types of devices.

The network device 410 may communicate with the UEs 420, 430 regarding the ambient IoT devices. In aspects, and as will be described in connection with FIG. 5 and FIG. 6, the network device 410 may select and instruct the UEs 420, 430 to provide backscattering service (e.g., transmitting activation signals or reading backscattered signals), and the UEs 420, 430 may provide the backscattering service. For example, the monostatic UE 420 may transmit an activation signal to the ambient IoT device 440 and read the backscattered signal, in the manner shown in FIG. 2. As another example, the monostatic UE 420 may transmit an activation signal to the ambient IoT device 450, and the bistatic UE 430 may read a backscattered signal, in the manner shown in FIG. 3. In aspects, and as will be described in connection with FIGS. 7-9, the network device 410 may provide authentication tokens to the UEs 420, 430 and the ambient IoT devices 440, 450 to allow them to authenticate each other. The authentication will be described in more detail below.

FIG. 4 is merely illustrative of a wireless networking scenario and, as persons skilled in the art will understand, different configurations, types of devices, and numbers of devices may be involved. Such different configurations and devices are within the scope of the present disclosure.

FIG. 5-8 will now describe a process in a network of selecting and instructing UEs to provide backscattering service to ambient IoT devices. The description may use smartphone as an example of a UE, but it is intended and shall be understood that any description referring to smartphone(s) shall be treated as though the description referred to UE(s) (of any type), as well. Also, the description may use gNB as an example of a network device, but it is intended and shall be understood that any description referring to gNB shall be treated as though the description referred to a network device (of any type), as well. The terms "AIoT" and/or "tag" may be used to refer an ambient IoT device. The term "network device(s)" may be used to indicate one or more network devices.

Figure 5:
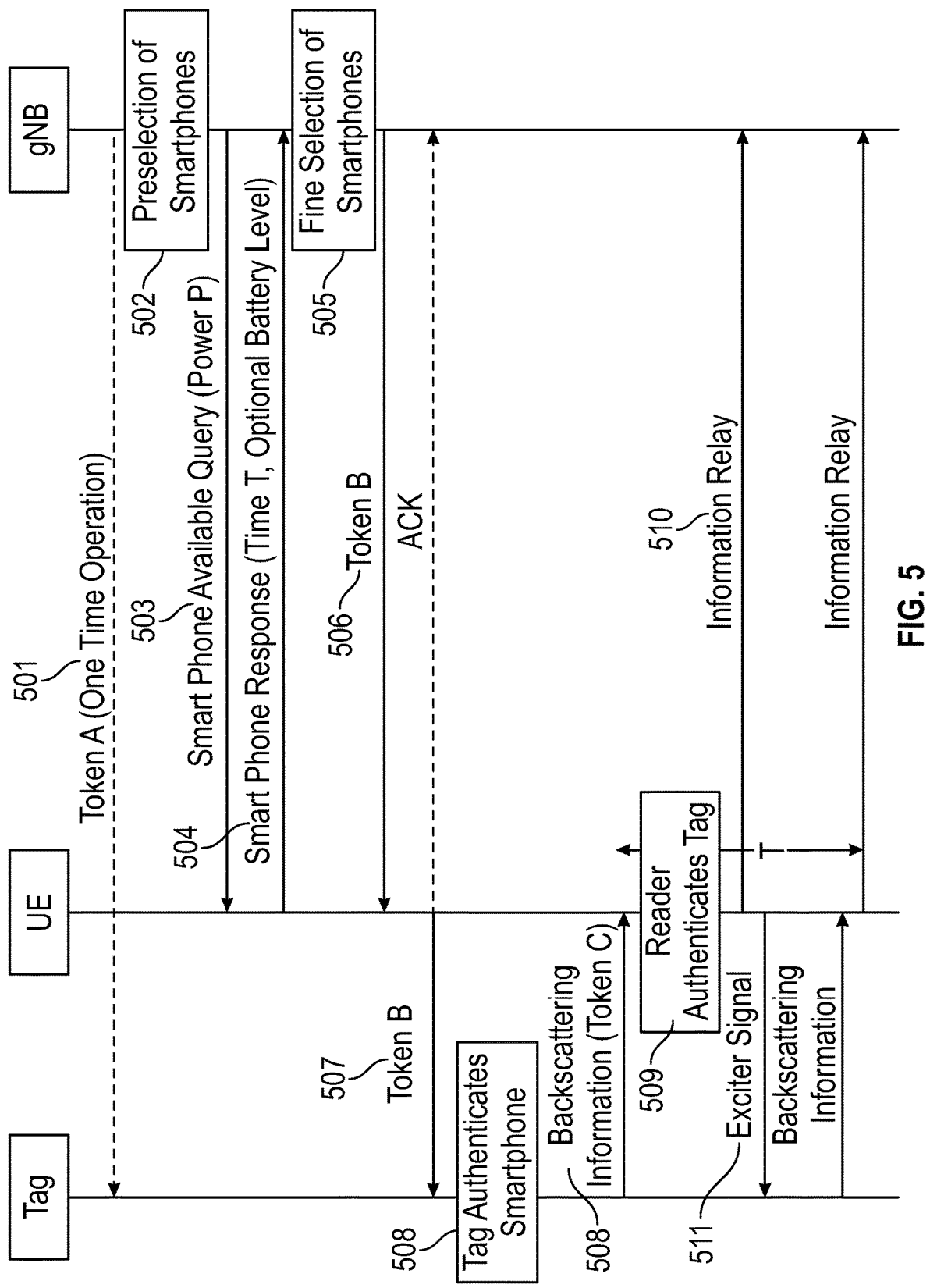
FIG. 5 is a diagram of an example embodiment of signals and operations among a UE configured as a gate reader, an ambient IoT device, a terminal reader, and a network, relating to ambient IoT device registration, according to one illustrated aspect of the disclosure.

Mobility management of ambient IoT devices 202 will now be described in connection with FIG. 5. FIG. 5 illustrates an example of a mobility management procedure, and it is intended and shall be understood that other types of cell mobility management are within the scope of the present disclosure. Referring now to FIG. 5, example signals and operations for mobility management of ambient IoT devices 202 are shown. As mentioned above, the terms "transmit towards," "receive from," and "cooperate with" (and their variations) include communications that may or may not involve communications through one or more intermediate devices or nodes. It is intended that any description referring to a gNB shall also be treated as though the description refers to a network node or a network device.

The present disclosure may use the term "network device" to refer to a network node, a gNB, AIoT server, or network device (or a portion thereof) that services a UE. The present disclosure may use the term "serving UE" to refer to a UE that services an ambient IoT device and may use the term "candidate UE" to refer to a UE that is a potential target of a command to have the UE provide ambient backscatter service for the ambient IoT device, and may use the term "backup UE" to refer to a UE that is the target of a command to have the UE act as a backup for providing ambient backscattering service for the ambient IoT device.

The following paragraphs describe various signals and operations. It will be understood that the described signals may have associated operations and the described operations may have associated signals. Accordingly, a described signal may also be an operation, and a described operation may also be a signal.

At operation 501, the network device (gNB) assigns a token set (Token A) to an ambient IoT device 202. For example, this token set can be assigned at the time of manufacturing or provisioned by a service provider. These tokens may be provided by a security server, and they might be unique to a particular ambient IoT device or group of ambient IoT devices (e.g., ambient IoT devices providing service for a particular application). The token set can be allocated/written on ambient IoT devices when they access the 3GPP network for the first time.

At operation 502, the network device preselects a plurality of candidate UE that are in the area for providing backscattering service to the ambient IoT device. When a UE is in the vicinity of a tag (or group of tags), it may be a candidate for preselection. Preselection of the candidate UEs may be based, for example, on tag density, their location distribution, and a number of UEs available in a particular region. To avoid unnecessarily preselecting of too many UEs, the network device may decide to randomly preselect a number N of UEs for status query.

At signals 503 and 504, the network device queries a candidate UE of its availability to provide backscattering service. This query may include requirements for the candidate UE. For example, the query may include parameters such as an excitation power P and parameter T to demonstrate time for which backscattering service is requested from a particular UE. The candidate UE may respond with information including a service time T and, optionally, a battery level. For example, the network device may transmit a "smartphone available" query to all UEs selected in preselection phase. UEs receiving this query may respond with NACK message or ACK message with a value for the parameter T implying a duration for which each UE is available for providing backscattering service.

At operation 505, the network device performs a fine selection of the candidate UEs to select a serving UE.

Fine selection of the UEs may be based on the responds from the candidate UEs. An example criterion could be to select only UEs with T>T1, wherein T1 is a minimum availability time set by the network device. Alternatively, T1 can be part of the query sent from the network device to UE and only UEs with T>T1 may be configured to respond to the query. T1 may be selected based on parameters such as tag density, their location and preselection of candidate UEs and their respective location, for example.

At signal 506, the network device transmits a token (Token B) to the selected serving UE. For example, the network device may transmit a token set B to the serving UE, which may be used by the serving UE to authenticate ambient IoT devices. In one example, token set B is the same as token set A.

At signal 507, the UE transmits an acknowledgment to the network device and transmits excitation (energy) signal and token B to ambient IoT devices, which authenticate the UE.

At operation 508, the ambient IoT device processes the token set B received from SM together with the previously stored token set A. If the ambient IoT device is successful in obtaining the desired result from this processing, the ambient IoT device authenticates the serving UE, and backscatters its own information.

At signal 509, if the serving UE receives backscattering information, the serving UE authenticates the ambient IoT device.

At signals 510 and 511, the serving UE relays information to the network device from the ambient IoT device.

The operations of FIG. 5 are examples. In some aspects, the operations may include additional steps before, after, and in between the enumerated steps. In some aspects, one or more of the enumerated steps may be omitted or performed in a different order. Such variations are contemplated to be within the scope of the present disclosure.

Figure 6:
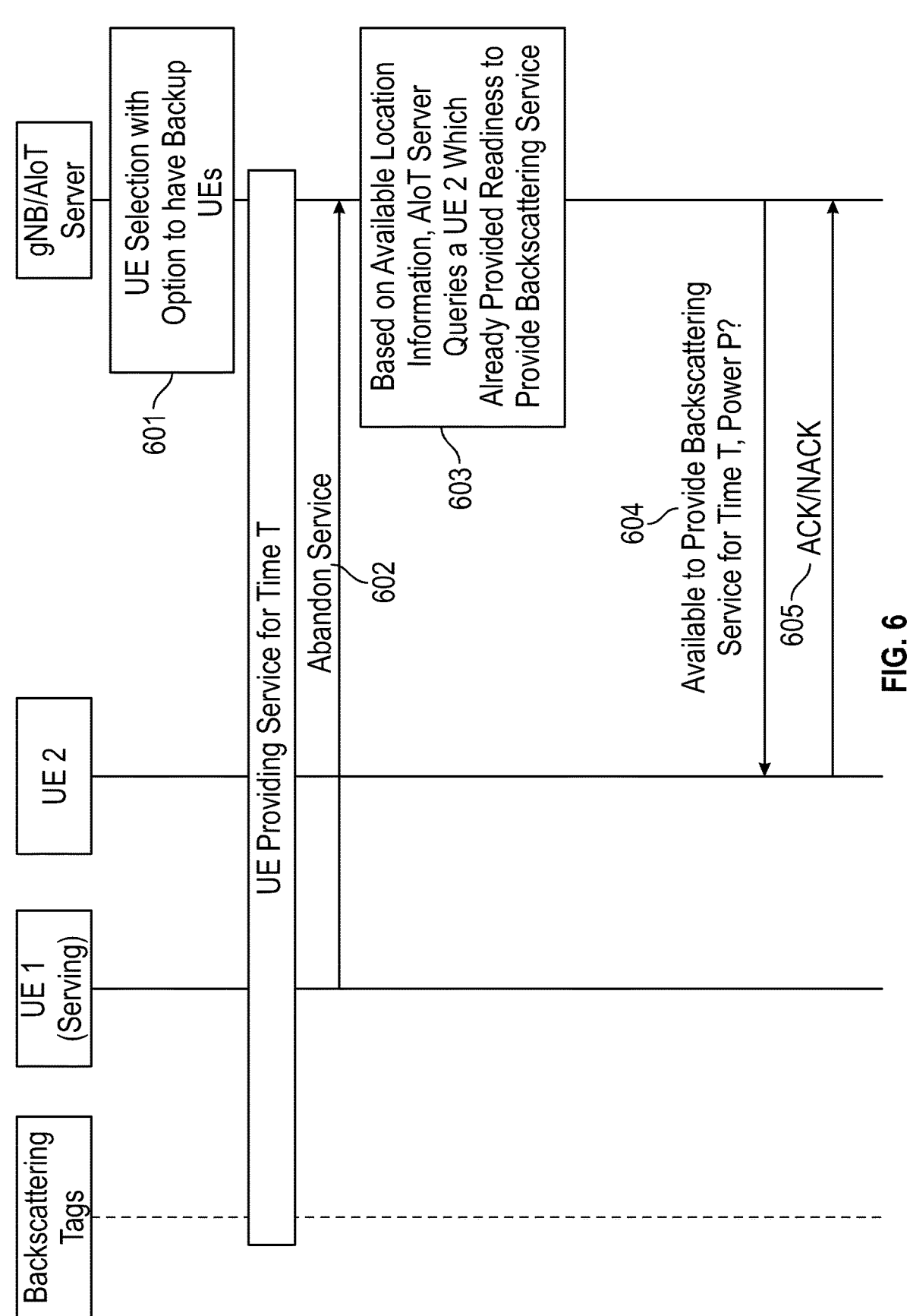
FIG. 6 is a diagram of an example embodiment of signals and operations among a serving UE, a backup UE, an ambient IoT device, and a gNB, relating to providing ambient backscattering service, according to one illustrated aspect of the disclosure.
Figure 7:
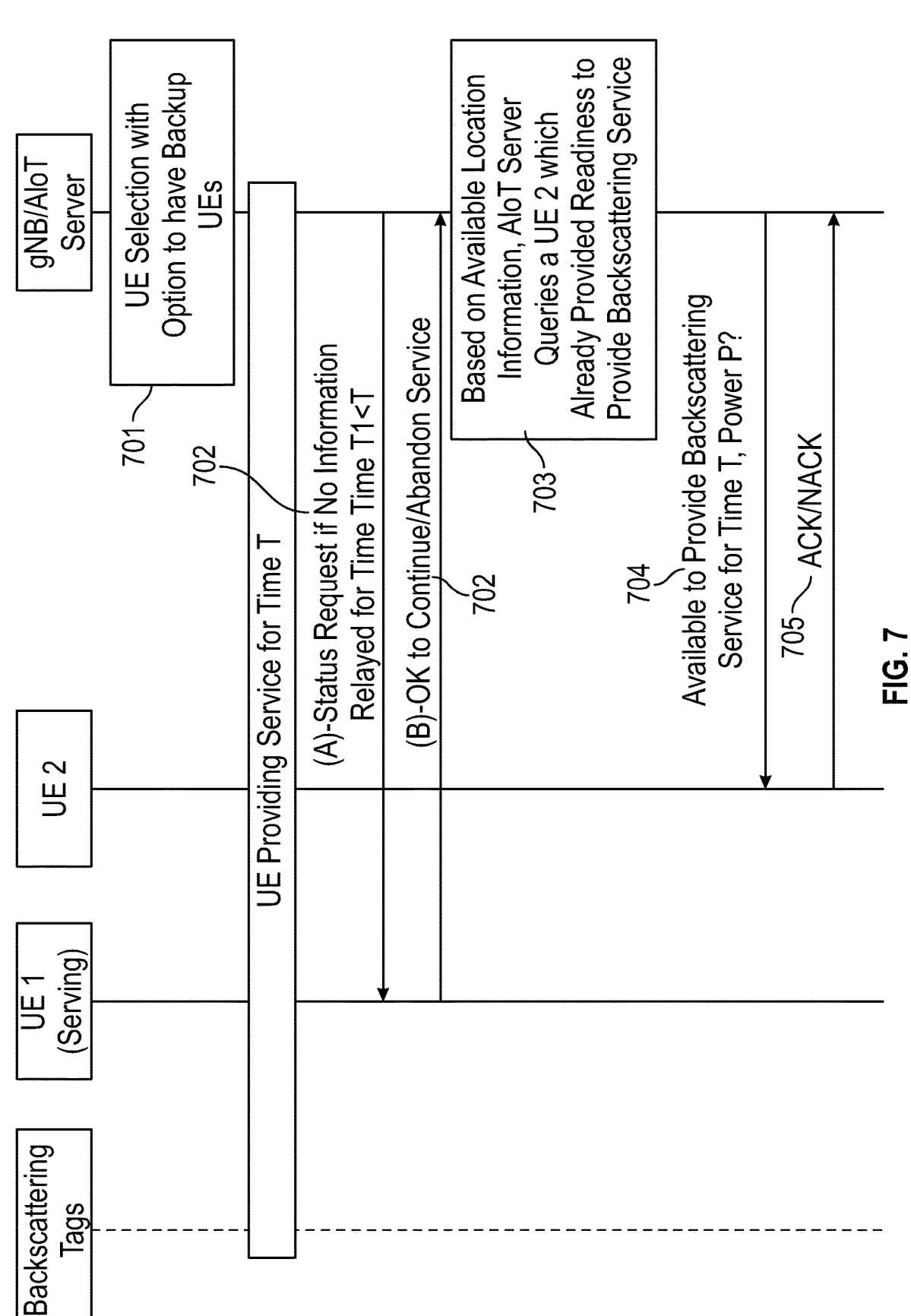
FIG. 7 is a diagram of an example embodiment of signals and operations among a serving UE, a backup UE, an ambient IoT device, and a gNB, relating to providing ambient backscattering service, according to one illustrated aspect of the disclosure.

A backup procedure for ambient IoT device 202 connectivity through a UE will now be described in connection with FIGS. 6 and 7. FIGS. 6 and 7 illustrate an example of a mobility management procedure, and it is intended and shall be understood that other types of mobility management are within the scope of the present disclosure. Referring now to FIGS. 6 and 7, example signals and operations for mobility management of ambient IoT devices 202 are shown. As mentioned above, the terms "transmit towards," "receive from," and "cooperate with" (and their variations) include communications that may or may not involve communications through one or more intermediate devices or nodes. It is intended that any description referring to a gNB shall also be treated as though the description refers to a network node and/or network device.

The following paragraphs describe various signals and operations. It will be understood that the described signals may have associated operations, and the described operations may have associated signals. Accordingly, a described signal may also be an operation, and a described operation may also be a signal.

FIGS. 6 and 7 provide a procedure for backup service where the network device takes care of providing service through a backup UE.

Prior to signal 601, ambient IoT device 202 backscattering service may be provided where a UE provides this service (referred to as "serving UE") to nearby ambient IoT devices. The serving UE is selected by the network device (gNB) based on a certain criterion after querying and receiving information from several available UEs, as shown in FIG. 5. For example, there may be several UEs available to provide backscattering service, however, the network device may only select a subgroup of UEs based on the ambient IoT device density, because selecting too many UEs may unnecessarily keep more UEs busy with providing this service than is necessary. Therefore, only a subset of UEs is selected to provide this service, and each UE is configured or confirms its ability to provide service for time T.

At operation 601, the network device selects a user equipment apparatus (e.g., a serving UE) to provide backscattering service to ambient IoT devices. As ambient IoT devices are large in number, it is expected that smartphones acting as exciters and/or readers can meet the requirements in "best effort mode" but without guaranteeing a quality of service (QOS).

In aspects, the network device selects not only the serving UE (that provides ambient IoT device backscattering service for time T), but also at least one backup UE (if available in the same area). The backup UE will not provide the function of providing the backscattering service while the serving UE is providing this service. In aspects, the network device may store information, for example, on the location of UEs, which may be used to determine the selection of backup UEs based on a criterion. For example, the network device may use information regarding which UEs are within a predetermined distance of each other. The network device may maintain a list of UEs in order of priority (based on distance from the serving UE, for instance) or randomly, that are able to provide backup backscattering service if needed.

The serving UE will receive, from the network device, an instruction to provide backscattering service to at least one ambient IoT device for a service period of time T, and provide, based on the instruction, the backscattering service to at least one device.

At signal 602, the serving UE decides to cease providing (i.e., abandon) the backscattering service prior to the end of the service period of time T. Even though the serving UE may commit to providing backscattering service for time T, the serving UE may decide to abandon this service before the expiration of time T. This could happen, for example, if the serving UE moves away from an area where ambient IoT devices are located. Since the serving UE is voluntarily providing this service in best-effort service mode, the network cannot stop it. The serving UE may decide not to provide this service based on a sudden drop in its energy level which could result from UE using some high energy-consuming applications or just malfunctioning of its battery.

In a case where the serving UE decides to abandon its backscattering service before the end of the configured time T due to any of the reasons described above, the serving UE may explicitly inform the network device of the decision to abandon providing the backscattering service.

Referring now to FIG. 7, which is substantially similar to FIG. 6, an alternate procedure for signal 602 is shown. At signal 702 (A), the serving UE may receive, from the network device, a request for an indication of availability to provide the backscattering service for at least a reminder of the service period of time T. At signal 702 (B) the serving UE may transmit, to the network device, a response to the request for the indication of availability. The response may include, for example, an indication to continue providing the backscattering service or an indication to cease providing the backscattering service. For example, in the case that the network device does not receive any relayed ambient IoT device's information from the serving UE for a predefined time T1<T, it may query serving SM for its availability to provide backscattering service for the remainder of the configured time T. The serving UE responds to the query, for example, with either an "OK to continue" or an "Abandon service" response. Lack of a response may be assumed to be an implicit "Abandon service." In aspects, the ambient IoT devices may not have data for transmission during the T1 period, which may be a reason for the serving UE not forwarding the data. In this case, the ambient IoT devices could be made to backscatter at least a "status OK" signal to the serving UE, i.e., in the case that the ambient IoT devices don't have any information data to transmit. In aspects, when the serving UE receives such a query from the network device, the serving UE may also check its own location to determine whether it has moved-serving UE may respond with an "Abandon service" if the serving UE detects a movement distance that exceeds a threshold value.

For example, the serving UE may determine a current location and a stored previous location. The stored position could be the position when the serving UE first started to provide backscattering service. The serving UE may determine a movement distance between the current location and the stored previous location and determine that the movement distance exceeds a threshold value. The serving UE may, based on the movement distance exceeding the threshold value, transmit to the network device a response to the request for the indication of availability comprising an indication to cease providing the backscattering service.

Referring back to FIG. 6, at operation 603 and signal 604, the network device, based on the received notification indicating the decision to cease providing the backscattering service, transmits to a backup UE (among one or more backup UEs) a request for an indication of availability to provide the backscattering service for at least a reminder of the service period of time T. For example, the network device may query the selected backup UE of its availability for providing a backscattering service for time T with certain requirements (e.g., power P). At signal 605, the backup UE transmits to the network device a response to the request for the indication of availability. The response includes either an indication of availability to provide the backscattering service or an indication of no availability to provide the backscattering service.

In a case where the selected backup UE is not available, the network device may already have selected more than one backup UE as alternate standby in operation 601. By repeating 603-605, the network device can query to find an alternate UE. If no backup UE is available to provide this service, the network device may start step 601.

The signals and operations of FIGS. 6 and 7 are examples. In some aspects, the operations may include additional steps before, after, and in between the enumerated steps. In some aspects, one or more of the enumerated steps may be omitted or performed in a different order. Such variations are contemplated to be within the scope of the present disclosure.

Figure 8:
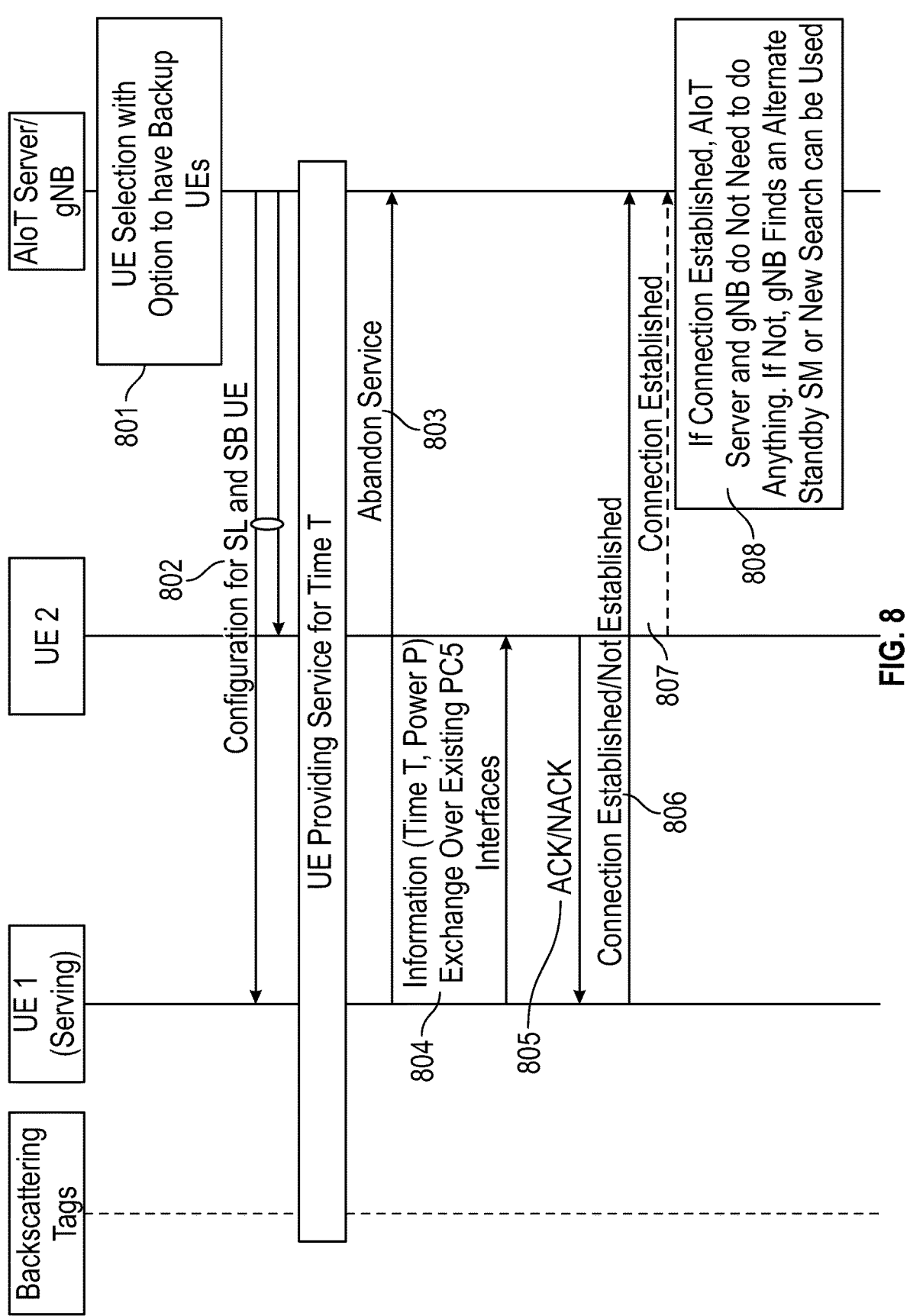
FIG. 8 is a diagram of an example embodiment of signals and operations among a serving UE, a backup UE, an ambient IoT device, and a gNB, relating to providing ambient backscattering service, according to one illustrated aspect of the disclosure.

A backup procedure for ambient IoT device 202 connectivity through a UE will now be described in connection with FIG. 8. FIG. 8 illustrates an example of a mobility management procedure, and it is intended and shall be understood that other types of mobility management are within the scope of the present disclosure. Referring now to FIG. 8, example signals and operations for mobility management of ambient IoT devices 202 are shown. As mentioned above, the terms "transmit towards," "receive from," and "cooperate with" (and their variations) include communications that may or may not involve communications through one or more intermediate devices or nodes. It is intended that any description referring to a gNB shall also be treated as though the description refers to a network node and/or network device.

The following paragraphs describe various signals and operations. It will be understood that the described signals may have associated operations, and the described operations may have associated signals. Accordingly, a described signal may also be an operation, and a described operation may also be a signal.

FIG. 8 provides a procedure for managing backscattering service utilizing sidelink (SL) communication. This solution is useful when there are large numbers of UEs available that are closely spaced, particularly when service abandon requests are in large numbers. In this case, this virtual "unexpected" service abandon request can be locally managed by the UEs without network involvement at the time of service disruption, which may help with reducing latency for the re-establishment of connection and reduce gNB management load for ambient IoT device backscattering.

At operation 801, the network device selects a user equipment apparatus (e.g., a serving UE) to provide backscattering service to ambient IoT devices. This is the same as in FIGS. 6, and 7.

At signal 802, a serving UE receives from a network device an instruction to provide backscattering service to at least one ambient IoT device for a service period of time T, the instruction comprising a configuration for sidelink communication with one or more backup user equipment apparatuses (backup UEs) capable of providing backscattering service to an ambient IoT device(s).

For example, the serving UE may be provided information regarding a standby UE with an initial configuration without any additional signaling but instead adding additional parameters to an existing "UE select" confirmation sent from the network device to the selected UE after step 801. The backup UE may also be provided the additional information. This configuration may contain the information required to establish sidelink communication (between the serving UE and the backup UE) for information exchange. The signaling parameters include, for example, service time T and excitation power P. The backup UE may store a configuration for performing the sidelink communication with the serving UE.

The serving UE provides, based on the instruction, the backscattering service at excitation power P.

At signal 803, the serving UE decides to cease providing the backscattering service prior to the end of the service period of time T and transmits, to the network device prior to the end of the service period of time T, a notification indicating the decision to cease providing the backscattering service. For example, when serving the serving UE decides to abandon backscattering service, the serving UE may transmit an Abandon service message to the network device. Since the network device knows that the serving UE can establish a link with a backup UE using sidelink communication, the network device takes no action. Ceasing service may also be performed using the operations and signals shown in FIG. 7, for example signals 702 (A) and 702 (B).

At signal 804, serving UE transmits, by the sidelink communication to the backup UE (among the backup UEs) a request for an indication of availability to provide the backscattering service for at least a reminder of the service period of time T. The request may indicate that the backscattering service is to be provided at an excitation power P. For example, the serving UE may exchange information (service time T, Power P) with the backup UE to determine if the backup UE is still available to provide this service (it may also not be available after being part of the selection process).

At signal 805, the backup UE may transmit to the serving UE a request for the indication of availability. The response may include an indication of availability to provide the backscattering service (ACK) or an indication of no availability to provide the backscattering service (NACK). For example, the backup UE transmits ACKs/NACKs to the serving UE to confirm/decline its availability.

At signal 806, the serving UE transmits, to the network device a message corresponding to the response. For example, the serving UE may signal to network device that backup UE is available for backscattering service. On receiving the message in signal 806 from the serving UE, the network device may perform, for example, the following:

If message is ACK, no further action is needed from gNB.

If message is NACK, gNB either finds another backup UE already identified in step 1 (if available) or starts the selection procedure from the beginning if no backup UE is available to replace serving SM.

At signal 807, the backup UE transmits, to the network device, an acknowledgment of providing the backscattering service. For example, if the backup UE is ready to provide backscattering service, it can optionally send ACK message to network device as well.

At operation 808, if no connection is established, the network device (gNB and/or AIoT server) may find an alternate backup UE, or a new search for a backup UE may be performed.

The signals and operations of FIG. 8 are examples. In some aspects, the operations may include additional steps before, after, and in between the enumerated steps. In some aspects, one or more of the enumerated steps may be omitted or performed in a different order. Such variations are contemplated to be within the scope of the present disclosure.

Figure 9:
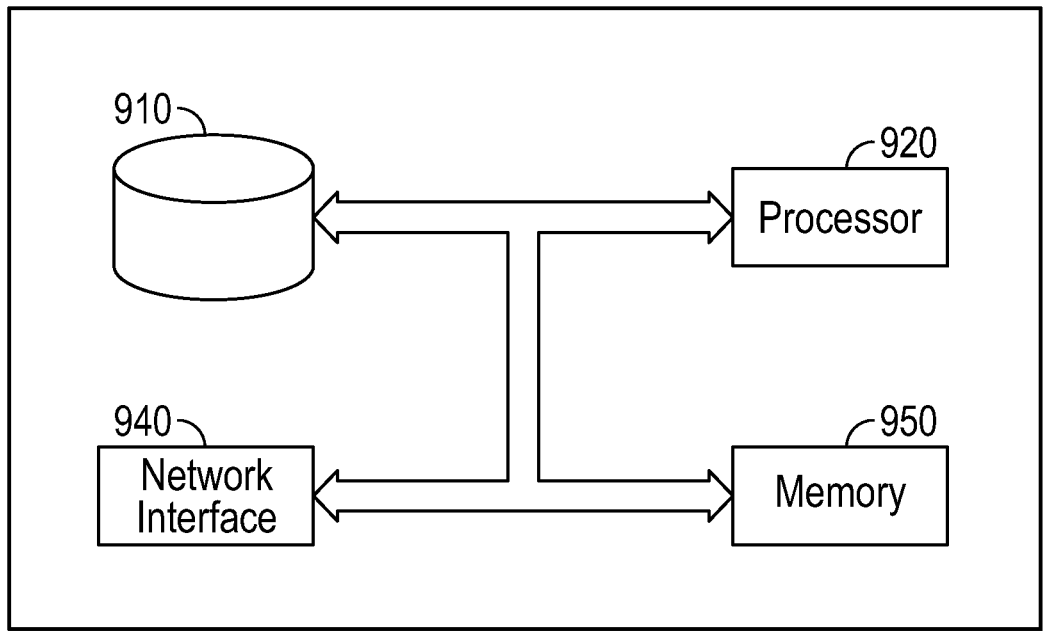
FIG. 9 is a diagram of example embodiment of components of a UE or of a network device, according to one illustrated aspect of the present disclosure.

Referring now to FIG. 9, there is shown a block diagram of example components of a UE or a network device. The apparatus includes an electronic storage 910, a processor 920, a memory 950, and a network interface 940. The various components may be communicatively coupled with each other. The processor 920 may be and may include any type of processor, such as a single-core central processing unit (CPU), a multi-core CPU, a microprocessor, a digital signal processor (DSP), a System-on-Chip (SoC), or any other type of processor. The memory 950 may be a volatile type of memory, e.g., RAM, or a non-volatile type of memory, e.g., NAND flash memory. The memory 950 includes processor-readable instructions that are executable by the processor 920 to cause the apparatus to perform various operations, including those mentioned herein, such as the operations of FIGS. 2-8.

The electronic storage 910 may be and include any type of electronic storage used for storing data, such as hard disk drive, solid state drive, and/or optical disc, among other types of electronic storage. The electronic storage 910 stores processor-readable instructions for causing the apparatus to perform its operations and stores data associated with such operations, such as storing data relating to 5G NR standards, among other data. The network interface 940 may implement wireless networking technologies such as 5G NR and/or other wireless networking technologies.

The components shown in FIG. 9 are merely examples, and persons skilled in the art will understand that an apparatus includes other components not illustrated and may include multiples of any of the illustrated components. Such and other embodiments are contemplated to be within the scope of the present disclosure.

Further embodiments of the present disclosure include the following examples.

Example 1. A user equipment apparatus comprising:

at least one processor; and at least one memory storing instructions which, when executed by the at least one processor, cause the user equipment apparatus at least to:

receive, from a network device, an instruction to provide backscattering service to at least one ambient IoT device for a service period of time T, the instruction comprising a configuration for sidelink communication with one or more backup user equipment apparatuses (backup UEs) capable of providing backscattering service to at least one ambient IoT device; and provide, based on the instruction, the backscattering service by transmitting at least one request for ambient IoT device identification.

Example 2. The user equipment apparatus of Example 1, wherein the instructions, when executed by the at least one processor, further cause the user equipment apparatus at least to:

decide to cease providing the backscattering service prior to the end of the period of time T; and transmit, to the network device prior to the end of the service period of time T, a notification indicating the decision to cease providing the backscattering service.

Example 3. The user equipment apparatus of Example 2, wherein the instructions, when executed by the at least one processor, further cause the user equipment apparatus at least to:

transmit, by the sidelink communication to a second UE among the one or more backup UEs, a request for an indication of availability to provide the backscattering service for at least a reminder of the service period of time T, wherein the request indicates that the backscattering service is to be provided at an excitation power P.

Example 4. The user equipment apparatus of Example 3, wherein the instructions, when executed by the at least one processor, further cause the user equipment apparatus at least to:

receive, from the second UE, a response to the request for the indication of availability, the response comprising one of:

an indication of availability to provide the backscattering service; or an indication of no availability to provide the backscattering service; and transmit, to the network device, a message corresponding to the response.

Example 5. A processor-implemented method comprising:

receiving, by a user equipment apparatus from a network device, an instruction to provide backscattering service to at least one ambient IoT device for a service period of time T, the instruction comprising a configuration for sidelink communication with one or more backup user equipment apparatuses (backup UEs) capable of providing backscattering service to at least one ambient IoT device; and providing, based on the instruction, the backscattering service by transmitting at least one request for ambient IoT device identification.

Example 6. The processor-implemented method of Example 5, further comprising:

deciding to cease providing the backscattering service prior to the end of the period of time T; and transmitting, to the network device prior to the end of the service period of time T, a notification indicating the decision to cease providing the backscattering service.

Example 7. The processor-implemented method of Example 6, further comprising:

transmitting, by the sidelink communication to a second UE among the one or more backup UEs, a request for an indication of availability to provide the backscattering service for at least a reminder of the service period of time T, wherein the request optionally indicates that the backscattering service is to be provided at an excitation power P.

Example 8. The processor-implemented method of Example 7, further comprising:

receiving, from the second UE, a response to the request for the indication of availability, the response comprising one of:

an indication of availability to provide the backscattering service; or an indication of no availability to provide the backscattering service; and transmitting, to the network device, a message corresponding to the response.

Example 9. A network device comprising:

at least one processor; and at least one memory storing instructions which, when executed by the at least one processor, cause the network device at least to:

select a first user equipment apparatus (first UE) to provide backscattering service to at least one ambient IoT device;

select one or more backup user equipment apparatuses (backup UEs) capable of providing the backscattering service to at least one ambient IoT device;

transmit, to the first UE, an instruction to provide the backscattering service to ambient IoT devices for a service period of time T, the instruction comprising a configuration for sidelink communication with at least one of the backup UEs; and transmit, to at least one of the backup UEs, a configuration for sidelink communication with the first UE.

Example 10. The network device of Example 9, wherein the instructions, when executed by the at least one processor, further cause the network device at least to:

receive, from the first UE prior to the end of the service period of time T, a notification indicating a decision to cease providing the backscattering service.

Example 11. The network device of Example 10, wherein the instructions, when executed by the at least one processor, further cause the network device at least to:

receive, from the first UE, a message comprising one of:

an indication that a second UE, among the one or more backup UEs, is available to provide the backscattering service; or an indication that the second UE is not available to provide the backscattering service.

Example 12. The network device of Example 11, wherein the message comprises the indication that the second UE is available to provide the backscattering service, wherein the instructions, when executed by the at least one processor, further cause the network device at least to:

receive, from the second UE, a message acknowledging that the second UE is providing the backscattering service.

Example 13. The network device of Example 11, wherein the message comprises the indication that the second UE is not available to provide the backscattering service, wherein the instructions, when executed by the at least one processor, further cause the network device at least to:

transmit, to at least one further UE among the one or more backup UEs, a request for an indication of availability to provide the backscattering service for at least a reminder of the service period of time T; and receive, from the at least one further UE, a response to the request for an indication of availability, the response comprising an indication of availability to provide the backscattering service.

Example 14. The network device of Example 11, wherein the message comprises the indication that the second UE is not available to provide the backscattering service, wherein the instructions, when executed by the at least one processor, further cause the network device at least to:

reperform selection of at least one user equipment apparatuses capable of providing the backscattering service to at least one ambient IoT device.

Example 15. A method comprising:

selecting, by a network device, a first user equipment apparatus (first UE) to provide backscattering service to at least one ambient IoT device;

selecting one or more backup user equipment apparatuses (backup UEs) capable of providing the backscattering service to at least one ambient IoT device;

transmitting, to the first UE, an instruction to provide the backscattering service to ambient IoT devices for a service period of time T, the instruction comprising a configuration for sidelink communication with at least one of the backup UEs; and transmitting, to at least one of the backup UEs, a configuration for sidelink communication with the first UE.

Example 16. The method of Example 15, further comprising:

receiving, from the first UE prior to the end of the service period of time T, a notification indicating a decision to cease providing the backscattering service.

Example 17. The processor-implemented method of Example 16, further comprising: receiving, from the first UE, a message comprising one of:

an indication that a second UE, among the one or more backup UEs, is available to provide the backscattering service; or an indication that the second UE is not available to provide the backscattering service.

Example 18. The method of Example 17, wherein the message comprises the indication that the second UE is available to provide the backscattering service, wherein the method further comprises:

receiving, from the second UE, a message acknowledging that the second UE is providing the backscattering service.

Example 19. The method of Example 17, wherein the message comprises the indication that the second UE is not available to provide the backscattering service, wherein the method further comprises:

transmitting, to at least one further UE among the one or more backup UEs, a request for an indication of availability to provide the backscattering service for at least a reminder of the service period of time T; and receiving, from the at least one further UE, a response to the request for an indication of availability, the response comprising an indication of availability to provide the backscattering service.

Example 20. The method of Example 17, wherein the message comprises the indication that the second UE is not available to provide the backscattering service, wherein the method further comprises:

reperforming selection of at least one user equipment apparatuses capable of providing the backscattering service to at least one ambient IoT device.

Example 21. A user equipment apparatus comprising:

at least one processor; and at least one memory storing instructions which, when executed by the at least one processor, cause the user equipment apparatus at least to:

transmit, to a network device, an indication of availability to provide backscattering service to ambient IoT devices;

receive, from the network device, a configuration for sidelink communication with a serving user equipment (serving UE) that is instructed by the network device to perform the backscattering service; and store the configuration for performing the sidelink communication with the serving UE.

Example 22. The user equipment apparatus of Example 21, wherein the instructions, when executed by the at least one processor, further cause the user equipment apparatus at least to:

implement, based on the configuration, the sidelink communication with the serving UE.

Example 23. The user equipment apparatus of Example 22, wherein the instructions, when executed by the at least one processor, further cause the user equipment apparatus at least to:

receive, by the sidelink communication from the serving UE, a request for an indication of availability to provide the backscattering service to ambient IoT devices for a period of time, wherein the request indicates that the backscattering service is to be provided at an excitation power P.

Example 24. The user equipment apparatus of Example 23, wherein the instructions, when executed by the at least one processor, further cause the user equipment apparatus at least to:

transmit, by the sidelink communication to the serving UE, a response to the request for indication of availability, the response comprising one of:

an indication of availability to provide the backscattering service; or an indication of no availability to provide the backscattering service.

Example 25. The user equipment apparatus of Example 24, wherein the response comprises an indication of availability to provide the backscattering service, wherein the instructions, when executed by the at least one processor, further cause the user equipment apparatus at least to provide the backscattering service to at least one ambient IoT device.

Example 26. The user equipment apparatus of Example 25, wherein the instructions, when executed by the at least one processor, further cause the user equipment apparatus at least to:

transmit, to the network device, an acknowledgment of providing the backscattering service.

Example 27. A method comprising:

transmitting, to a network device, an indication of availability to provide backscattering service to ambient IoT devices;

receiving, from the network device, a configuration for sidelink communication with a serving user equipment (serving UE) that is instructed by the network device to perform the backscattering service; and storing the configuration for performing the sidelink communication with the serving UE.

Example 28. The method of Example 27, further comprising:

implementing, based on the configuration, the sidelink communication with the serving UE.

Example 29. The method of Example 28, further comprising:

receiving, by the sidelink communication from the serving UE, a request for an indication of availability to provide the backscattering service to ambient IoT devices for a period of time, wherein the request indicates that the backscattering service is to be provided at an excitation power P.

Example 30. The method of Example 29, further comprising:

transmitting, by the sidelink communication to the serving UE, a response to the request for indication of availability, the response comprising one of:

an indication of availability to provide the backscattering service; or an indication of no availability to provide the backscattering service.

Example 31. The method of Example 30, wherein the response comprises an indication of availability to provide the backscattering service, wherein the method may further include providing the backscattering service to at least one ambient IoT device.

Example 32. The method of Example 31, further comprising:

transmitting, to the network device, an acknowledgment of providing the backscattering service.

The embodiments and aspects disclosed herein are examples of the present disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an aspect," "in aspects," "in various aspects," "in some aspects," or "in other aspects" may each refer to one or more of the same or different aspects in accordance with this present disclosure. The phrase "a plurality of" may refer to two or more.

The phrases "in an embodiment," "in embodiments," "in various embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, Python, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

While aspects of the present disclosure have been shown in the drawings, it is not intended that the present disclosure be limited thereto, as it is intended that the present disclosure be as broad in scope as the art will allow and that the specification be read likewise. Therefore, the above description should not be construed as limiting, but merely as exemplifications of particular aspects. Those skilled in the art will envision other modifications within the scope and spirit of the claims appended hereto.

What is claimed is:

1. A user equipment apparatus comprising:
at least one processor; and
at least one memory storing instructions which, when executed by the at least one processor, cause the user equipment apparatus at least to:
receive, from a network device, an instruction to provide backscattering service to at least one ambient IoT device for a network-configured service period of time T in a best-effort mode without a guaranteed quality of service, the instruction comprising an identification of at least one backup user equipment apparatus (backup UE) selected by the network device and a configuration for sidelink communication with one or more backup user equipment apparatuses (backup UEs) capable of providing backscattering service to at least one ambient IoT device; and
provide, based on the instruction, the backscattering service at an excitation power parameter P included in the instruction by transmitting at least one request for tag identification and, prior to expiration of the service period of time T, upon deciding to cease providing the backscattering service, transmit via the configured sidelink communication a request for an indication of availability to the identified backup UE to locally determine continuation of the backscattering service without network-initiated reselection.

2. The user equipment apparatus of claim 1, wherein the instructions, when executed by the at least one processor, further cause the user equipment apparatus at least to:
transmit, by the sidelink communication to a second UE among the one or more backup UEs, a request for an indication of availability to provide the backscattering service for at least a reminder of the service period of time T, wherein the request indicates that the backscattering service is to be provided at an excitation power P.

3. The user equipment apparatus of claim 2, wherein the instructions, when executed by the at least one processor, further cause the user equipment apparatus at least to:
receive, from the second UE, a response to the request for the indication of availability, the response comprising one of:
an indication of availability to provide the backscattering service; or
an indication of no availability to provide the backscattering service; and
transmit, to the network device, a message corresponding to the response.

4. A method comprising:
receiving, by a user equipment apparatus from a network device, an instruction to provide backscattering service to at least one ambient IoT device for a network-configured service period of time T in a best-effort mode without a guaranteed quality of service, the instruction comprising an identification of at least one backup user equipment apparatus (backup UE) selected by the network device and a configuration for sidelink communication with one or more backup user equipment apparatuses (backup UEs) capable of providing backscattering service to at least one ambient IoT device; and
providing, based on the instruction, the backscattering service at an excitation power parameter P included in the instruction by transmitting at least one request for tag identification and, prior to expiration of the service period of time T, upon deciding to cease providing the backscattering service, transmit via the configured sidelink communication a request for an indication of availability to the identified backup UE to locally determine continuation of the backscattering service without network-initiated reselection.

5. The method of claim 4, further comprising:
transmitting, by the sidelink communication to a second UE among the one or more backup UEs, a request for an indication of availability to provide the backscattering service for at least a reminder of the service period of time T,
wherein the request indicates that the backscattering service is to be provided at an excitation power P.

6. The method of claim 5, further comprising:
receiving, from the second UE, a response to the request for the indication of availability, the response comprising one of:
an indication of availability to provide the backscattering service; or
an indication of no availability to provide the backscattering service; and
transmitting, to the network device, a message corresponding to the response.

* * * * *